US00RE46133E

(19) United States
(12) Reissued Patent
Jung

(10) Patent Number: US RE46,133 E
(45) Date of Reissued Patent: Sep. 6, 2016

(54) COSMETIC CONTAINER

(71) Applicant: AMOREPACIFIC CORPORATION, Seoul (KR)

(72) Inventor: Hyang Hee Jung, Seoul (KR)

(73) Assignee: AMOREPACIFIC CORPORATION, Seoul (KR)

(21) Appl. No.: 29/463,940

(22) Filed: Mar. 20, 2014

Related U.S. Patent Documents

Reissue of:
(64) Patent No.: Des. 696,121
Issued: Dec. 24, 2013
Appl. No.: 29/439,191
Filed: Dec. 7, 2012

(30) Foreign Application Priority Data

Jun. 13, 2012 (KR) ..... 30-2012-0028889

(51) LOC (10) Cl. ..... 09-01
(52) U.S. Cl.
USPC ..... D9/503; D9/558
(58) Field of Classification Search
USPC ..... D9/435, 454, 500, 502–505, 516, 529, D9/549, 558, 682, 686, 688–691, D9/779–780; D28/4, 76–77; 215/379, 215/381–382; 220/660, 669–673, 675
See application file for complete search history.

(56) References Cited

U.S. PATENT DOCUMENTS

D206,628 S * 1/1967 Anderson ..... D9/503
D208,885 S * 10/1967 Roehrich ..... D9/503
D357,628 S * 4/1995 Vasas ..... D9/503
D365,759 S * 1/1996 Otani et al. ..... D9/504
D400,783 S * 11/1998 de Mourgues ..... D9/691
D405,358 S * 2/1999 Dapsanse ..... D9/663
D423,922 S * 5/2000 Ohchi et al. ..... D9/688
D485,183 S * 1/2004 Lerolle ..... D9/503
D643,743 S * 8/2011 Yu ..... D9/689
D645,746 S * 9/2011 Yu ..... D9/503
D680,443 S * 4/2013 You ..... D9/691
D683,238 S * 5/2013 You ..... D9/688

* cited by examiner

*Primary Examiner* — Phillip S Hyder
(74) *Attorney, Agent, or Firm* — Ohlandt, Greeley, Ruggiero & Perle, L.L.P.

(57) CLAIM

The ornamental design for a cosmetic container, as shown and described.

DESCRIPTION

FIG. 1 is a perspective view of the cosmetic container of the present invention;
FIG. 2 is a front elevation view of the cosmetic container shown in FIG. 1;
FIG. 3 is a rear elevation view of the cosmetic container shown in FIG. 1;
FIG. 4 is a left side elevation view of the cosmetic container shown in FIG. 1;
FIG. 5 is a right side elevation view of the cosmetic container shown in FIG. 1;
FIG. 6 is a top plan view of the cosmetic container shown in FIG. 1; and,
FIG. 7 is a bottom plan view of the cosmetic container shown in FIG. 1.

1 Claim, 6 Drawing Sheets

Figure 1:
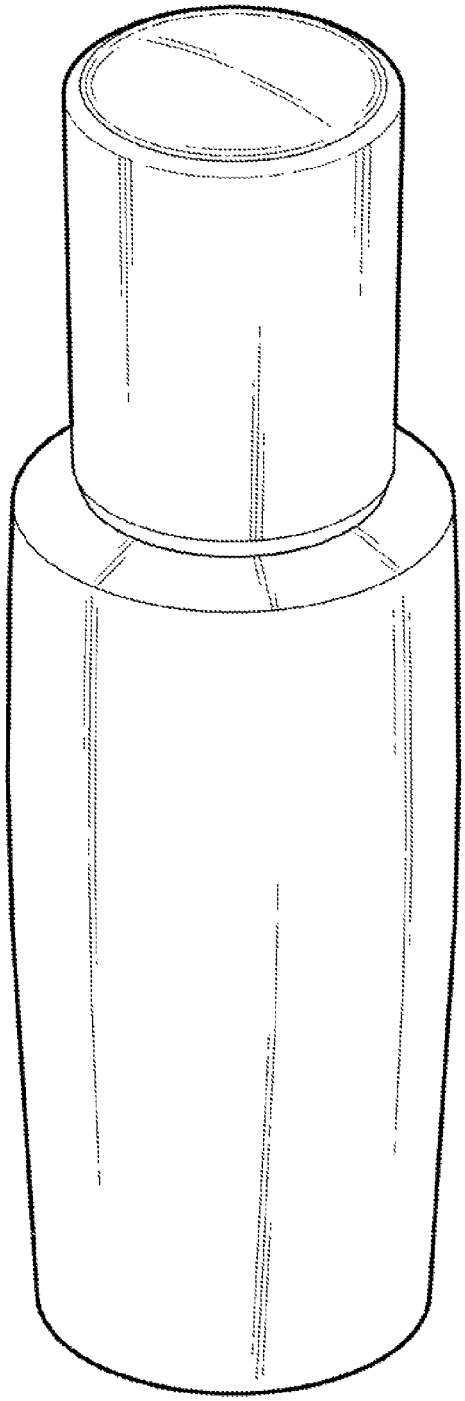
Figure 2:
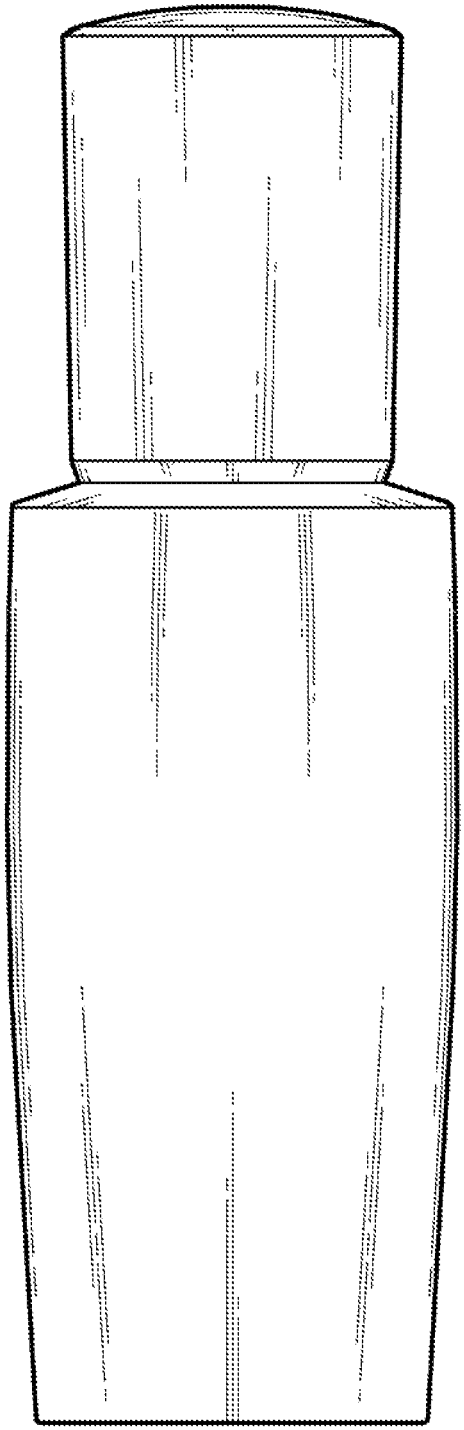
Figure 3:
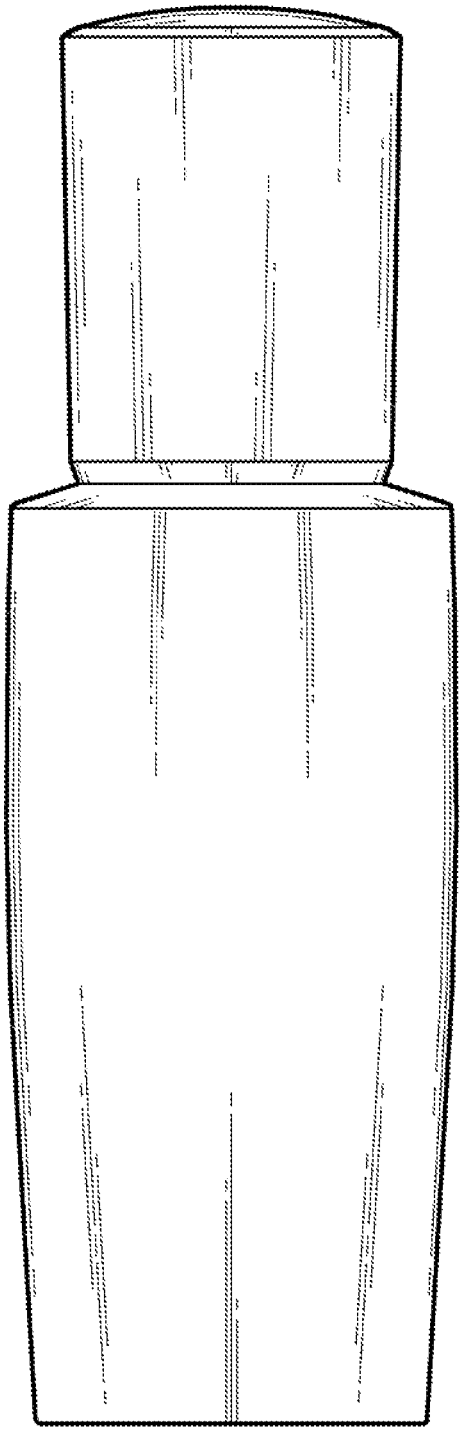
Figure 4:
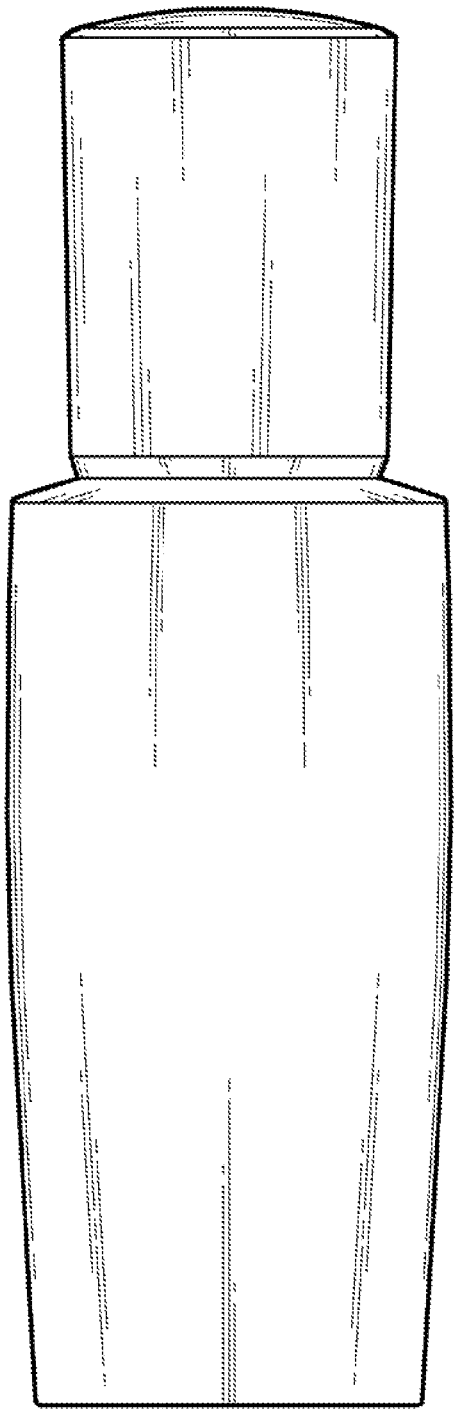
Figure 5:
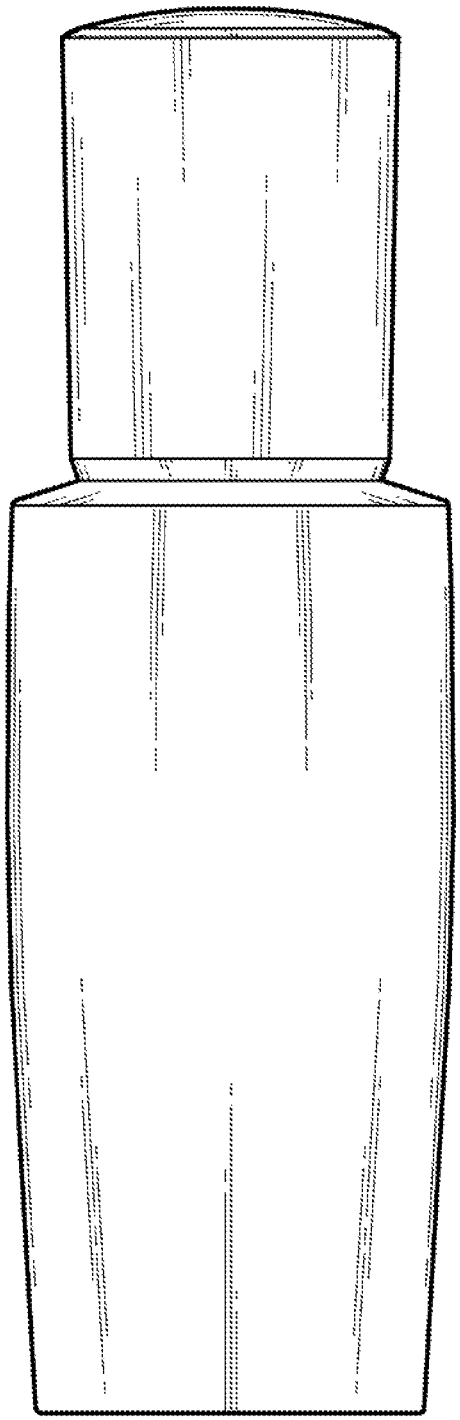
Figure 6:
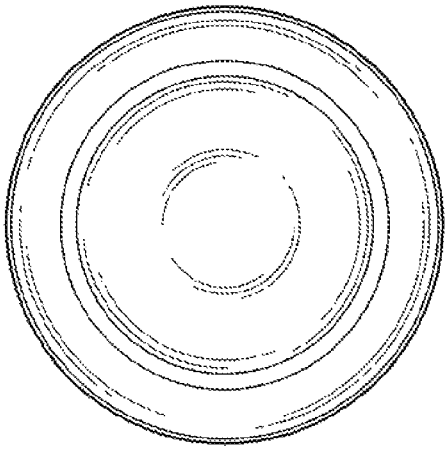
Figure 7:
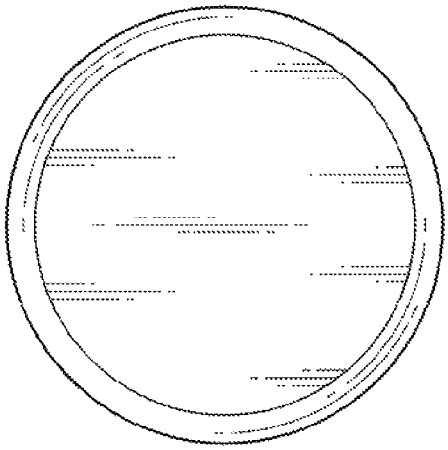

Matter enclosed in heavy brackets [ ] appears in the original patent but forms no part of this reissue; matter printed in italics indicates the additions made by reissue.